(12) United States Patent
Lindberg

(10) Patent No.: US 9,926,890 B2
(45) Date of Patent: Mar. 27, 2018

(54) PIPE UNIT IN A CONDUIT FOR A GASEOUS MEDIUM

(71) Applicant: Scania CV AB, Södertälje (SE)

(72) Inventor: Peter Lindberg, Umeå (SE)

(73) Assignee: Scania CV AB, Södertälje (SE)

(*) Notice: Subject to any disclaimer, the term of this patent is extended or adjusted under 35 U.S.C. 154(b) by 0 days.

(21) Appl. No.: 15/320,609

(22) PCT Filed: Jul. 7, 2015

(86) PCT No.: PCT/SE2015/050802
§ 371 (c)(1),
(2) Date: Dec. 20, 2016

(87) PCT Pub. No.: WO2016/013970
PCT Pub. Date: Jan. 28, 2016

(65) Prior Publication Data
US 2017/0198663 A1    Jul. 13, 2017

(30) Foreign Application Priority Data

Jul. 24, 2014 (SE) ...................................... 1450914

(51) Int. Cl.
*F02M 25/07*  (2006.01)
*F02M 26/14*  (2016.01)
*F16L 51/02*  (2006.01)

(52) U.S. Cl.
CPC ........... *F02M 26/14* (2016.02); *F16L 51/025* (2013.01)

(58) Field of Classification Search
CPC ........ F02M 26/12; F02M 26/13; F02M 26/14; F02M 26/17; F16L 51/025

(Continued)

(56) References Cited

U.S. PATENT DOCUMENTS 2,712,456 A * 7/1955 McCreery ........... F01N 13/1811
                                                     285/145.5
3,459,444 A * 8/1969 Rofe ................... F01N 13/1816
                                                     180/296

(Continued)

FOREIGN PATENT DOCUMENTS

EP         664416 A1     7/1995
FR        2369497 A1     5/1978
SE        535677 C2     11/2012

OTHER PUBLICATIONS

International Search Report of the International Searching Authority for PCT/2015/054820 dated Oct. 14, 2015.

(Continued)

*Primary Examiner* — Hai Huynh
(74) *Attorney, Agent, or Firm* — Moore & Van Allen PLLC; W. Kevin Ransom

(57) ABSTRACT

A pipe unit for arrangement in a conduit for a gaseous medium, comprising a pipe-shaped body, a pipe-shaped flexible sealing element, which is fixedly attached at a first end outside the pipe-shaped body and which comprises a flange element at a second end. The flange element is detachably attachable to a flange element in a connecting pipe in the conduit, in order to, when the flange elements are fixed to each other and the pipe unit is accordingly connected with the connecting pipe, to allow movement between the pipe-shaped body and the connecting pipe via the sealing element's flexibility. A mutual fixation of said flange element forms the only touching connection of the pipe unit to said connecting pipe.

20 Claims, 3 Drawing Sheets

(58) Field of Classification Search
 USPC .................................................. 123/568.17
 See application file for complete search history.

(56) References Cited

U.S. PATENT DOCUMENTS

| | | |
|---|---|---|
| 5,159,811 A | 11/1992 | Hefler et al. |
| 6,415,603 B1 * | 7/2002 | Nowka ................. F01N 3/2882 285/223 |
| 2001/0054820 A1 | 12/2001 | Starita |

OTHER PUBLICATIONS

Written Opinion of the International Searching Authority of PCT/2015/054820 dated Oct. 14, 2015.

* cited by examiner

PIPE UNIT IN A CONDUIT FOR A GASEOUS MEDIUM

CROSS-REFERENCE TO RELATED APPLICATION(S)

This application is a national stage application (filed under 35 § U.S.C. 371) of PCT/SE15/050802, filed Jul. 7, 2015 of the same title, which, in turn claims priority to Swedish Application No. 1450914-5, filed Jul. 24, 2014 of the same title; the contents of each of which are hereby incorporated by reference.

FIELD OF THE INVENTION

The present invention relates to a pipe unit, adapted to be arranged in a conduit for a gaseous medium.

BACKGROUND OF THE INVENTION

In order to reduce the level of nitrogen oxides, i.e. $NO_x$, in the exhausts from a combustion engine, prior art recirculates some of the exhausts through a return conduit to the combustion engine's inlet. A return conduit for recirculation of exhausts consists of several pipes and components, such as an EGR-valve and an EGR-cooler, for cooling of the exhausts before they are mixed with air and led back to the combustion engine. The return conduit for the exhausts extends from the combustion engine's hot side, where the exhaust conduit is arranged, to the cold side of the combustion engine, where air is led into the combustion engine. During the operation of the combustion engine the individual pipes and components in the return conduit are subjected to vibrations and thermal loads. In order to avoid creation of excessive strains in the return conduit, prior art connects connecting pipes in the return conduit with contact surfaces, facilitating a certain mobility of the pipes in relation to each other. However, such contact surfaces increase the risk of leakages in the connections between connecting pipes. Prior art uses sealing rings made of wrought iron or steel for sealing between the contact surfaces of adjacent pipes in the conduit. However, it is difficult to create completely sealed connections between the contact surfaces with stiff sealing rings made of metal.

The pipe unit defined above, previously known via SE 535 677 C2, counteracts these disadvantages, since such pipe unit is equipped with a contact surface which, when in a connected state with a contact surface of a connecting pipe, facilitates a mobility between the contact surfaces, and thus a mobility between the pipe unit and the connecting pipe. This mobility substantially prevents the occurring of tensions between the pipe unit and the connecting pipe when they are subjected to mechanical and thermal loads. Even though the contact surface of the pipe unit and the contact surface of the connecting pipe are moveably arranged in relation to each other, they may prevent leakages of the gaseous medium relatively well. Through the existence of a pipe-shaped flexible sealing element, a completely sealed connection between the pipe unit and the connecting pipe may, however, be established. Accordingly, a pipe unit of this type may create a so-called expansion joint with a connecting pipe and thereby achieve a so-called double sealing, since in the event a crack or similar should arise in the pipe-shaped flexible sealing element, the pipe-shaped body is available as an extra security inside of this.

Even though the pipe unit described in SE 535 677 C2 functions well, there is naturally a wish to improve it in some respect.

SUMMARY OF THE INVENTION

The objective of the present invention is to provide a pipe unit of the type defined above, which is improved in at least some respect in relation to prior art pipe units of this type.

Since said means for fixation of the sealing element's flange element to a flange element in a connecting pipe is adapted to establish a gas-proof connection between the pipe unit and a said connecting pipe and, via a mutual fixation of said flange element, to form the only touching connection of the pipe unit to the said connecting pipe, the pipe unit has a very simple design, since the pipe-shaped body of the pipe unit does not need to be adapted to any part of the connecting pipe, which in turn facilitates a simplified assembly and disassembly of the pipe unit in relation to the connecting pipe, compared to such prior art pipe units.

According to one embodiment of the invention the pipe-shaped body has end sections with external circumferential surfaces, which circumferentially abut against an internal wall surface of the pipe unit's flange element. In this manner, a good double sealing function is obtained in the pipe unit, without the pipe-shaped body having to interact with any part of said connecting pipe.

According to another embodiment of the invention, the sealing element's flange elements have flange surfaces adapted to abut, at said fixation state, against flange surfaces of a said flange element in a said connecting pipe. In this manner, a tight connection between the pipe unit and a connecting pipe may be achieved via said flange element.

According to another embodiment of the invention said flange surfaces of the sealing element are adapted to extend at a substantially right angle or at a right angle towards the pipe-shaped body's longitudinal extension. Such a design of the flange element facilitates the assembly and disassembly of the pipe unit in relation to connecting pipes.

According to another embodiment of the invention, said means comprise an annular sealing element, adapted, at said fixation of the sealing element's flange element to a flange element of a connecting pipe, to be compressed between the flange elements in order to establish said gas-proof connection between the pipe unit and the connecting pipe, said sealing element advantageously being an O-ring. In this manner, a gas-proof connection with high reliability may be achieved between said flange elements, and thus between the pipe unit and a connecting pipe, via the flange elements' mutual fixation.

According to another embodiment of the invention, said flange elements of said sealing elements are adapted to form an end of the pipe unit, by virtue of extending longer than said pipe-shaped body in the direction from said first end towards said second end of the sealing element. This means that the pipe-shaped body, in the case of a pipe unit connected with a connecting pipe, will not reach said connecting pipe, which means that assembly and disassembly is very simple even in confined spaces, since in such case the pipe unit and the connecting pipe may be joined and separated without any part having to be inserted into any other part.

According to another embodiment of the invention, said means comprises elements adapted to fix, via a screw joint, said flange elements to each other. This, combined with the previous embodiment, makes assembly and disassembly easy. At disassembly, only the screw joint must thus be loosened, and subsequently the pipe unit may be lifted off the connecting pipe transversely in relation to the latter.

According to another embodiment of the invention, the pipe-shaped flexible sealing element is bellows-shaped, which means that it may be bent in substantially all directions and also may alter its length elastically. A bellows-shaped sealing element thus allows most types of mutual movements between the pipe unit and a connecting pipe. The bellows-shaped sealing element is thus advantageously constructed in such a manner that it may resist high pressures and high temperatures in the gaseous medium. The bellows-shaped sealing element is thus advantageously made of a metal material with suitable properties.

According to another embodiment of the invention, said fixed arrangement of the pipe-shaped flexible sealing element outside the pipe-shaped body comprises a welded joint.

According to another embodiment of the invention, the pipe unit is equipped with a said flexible sealing element at said pipe-shaped body's both ends. Thus, an assembly and disassembly of the pipe unit in relation to connecting pipes at both ends becomes very easy to carry out, because the pipe unit is adapted to be connected to the respective connecting pipes via only one flange element.

According to another embodiment of the invention, the pipe unit is adapted to constitute a part of a conduit for recirculation of exhausts, which conduit is at least partly fixed on a combustion engine. Conduits for recirculation of exhausts extend between the combustion engine's warm side, where the exhausts are led out, and the combustion engine's cold side, where air is led into the combustion engine. It is thus suitable to attach the conduit on the combustion engine. The conduit for recirculation of exhausts is therefore subjected to vibrations from the combustion engine. A conduit for recirculation of exhausts is also subjected to a large thermal load, since the exhausts have a high temperature. Because of this, the pipe unit according to the present invention is very suitable for use as a component in a conduit for recirculation of exhausts, because it prevents, in an efficient manner, the occurrence of tensions caused by mechanical and thermal loads. The pipe unit is, according to another embodiment of the invention, advantageously adapted to be fitted in the conduit between a branch pipe that receives exhausts from an exhaust conduit in the combustion engine, and a pipe comprising an EGR-valve. However, it is possible to fit the pipe unit at other positions in the conduit as well.

The invention also relates to a motor vehicle with a pipe unit according to the present invention for recirculation of exhausts from a combustion engine of the vehicle.

Other advantages and advantageous features of the invention are set out in the description below.

BRIEF DESCRIPTION OF THE DRAWINGS

Below are descriptions of an example embodiment of the invention with reference to the enclosed drawings, in which.

DETAILED DESCRIPTION OF THE INVENTION

Figure 1:
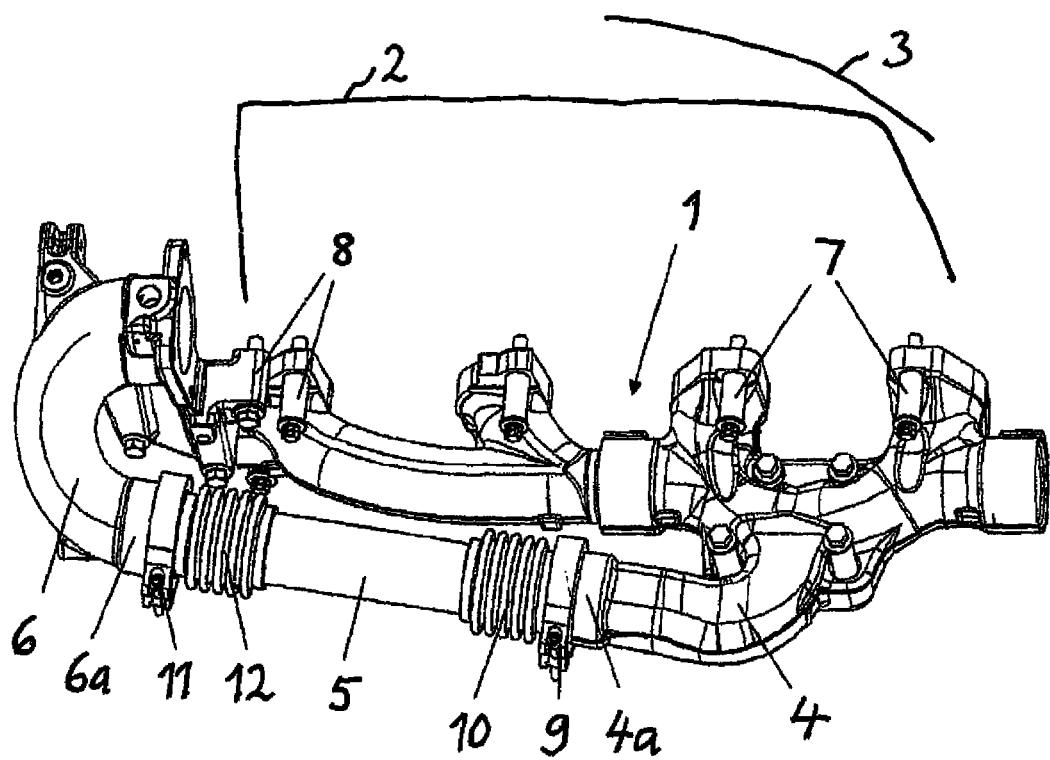
FIG. 1 shows a part of a conduit for recirculation of exhausts in a combustion engine.

FIG. 1 shows a part of a conduit 1 for recirculation of exhausts to a schematically implied combustion engine 2, e.g. a diesel engine, in a similarly schematically implied motor vehicle 3, for example a truck. The conduit 1 comprises a branch pipe 4 for receipt of exhausts from a non-displayed exhaust conduit of the combustion engine. The recirculated exhausts in the conduit 1 are led from the branch pipe 4 to a pipe unit 5. From the pipe unit 5, the exhausts are led to a pipe 6 comprising an EGR-valve. The recirculated exhausts are subsequently led to a non-displayed EGR-cooler, where they are cooled before being mixed with air and led back to the combustion engine. The conduit 1 leads the recirculated exhausts from the combustion engine's warm side, where the exhaust conduit is located, to the combustion engine's cold side, where air is sucked into the combustion engine. The branch pipe 4 is attached to the combustion engine 2 with a number of attachment elements 7, for example bolts. The pipe 6 containing the EGR-valve is also attached to the combustion engine with a number of attachment elements 8, which may be bolts.

During the operation of the combustion engine, the conduit 1 is subjected to vibrations from the combustion engine and to thermal loads from the warm exhausts. The exhausts in a diesel engine may have a temperature in the range of 600-700° C. In this case, the pipe unit 5 constitutes a connection between the branch pipe 2 and the pipe 6 with the EGR-valve. The pipe unit 5 displayed in FIG. 1 is of a type which is prior art under SE 535 677 C2, and is detachably connected with a connecting section 4a of the branch pipe 4 with the help of a first V-clamp 9. The pipe unit 5 comprises a first pipe-shaped flexible sealing element 10, which ensures that no exhausts leak from the connection between the pipe unit 5 and the branch pipe 4. The pipe unit 5 is, at an opposite end, connected with a connecting section 6a of the pipe 6 that comprises the EGR-valve, with a second V-clamp 11. The pipe unit 5 comprises a second pipe-shaped flexible sealing element 12, which ensures that no exhausts leak from the connection between the pipe unit 5 and the pipe 6 that comprises the EGR-valve.

Figure 2:
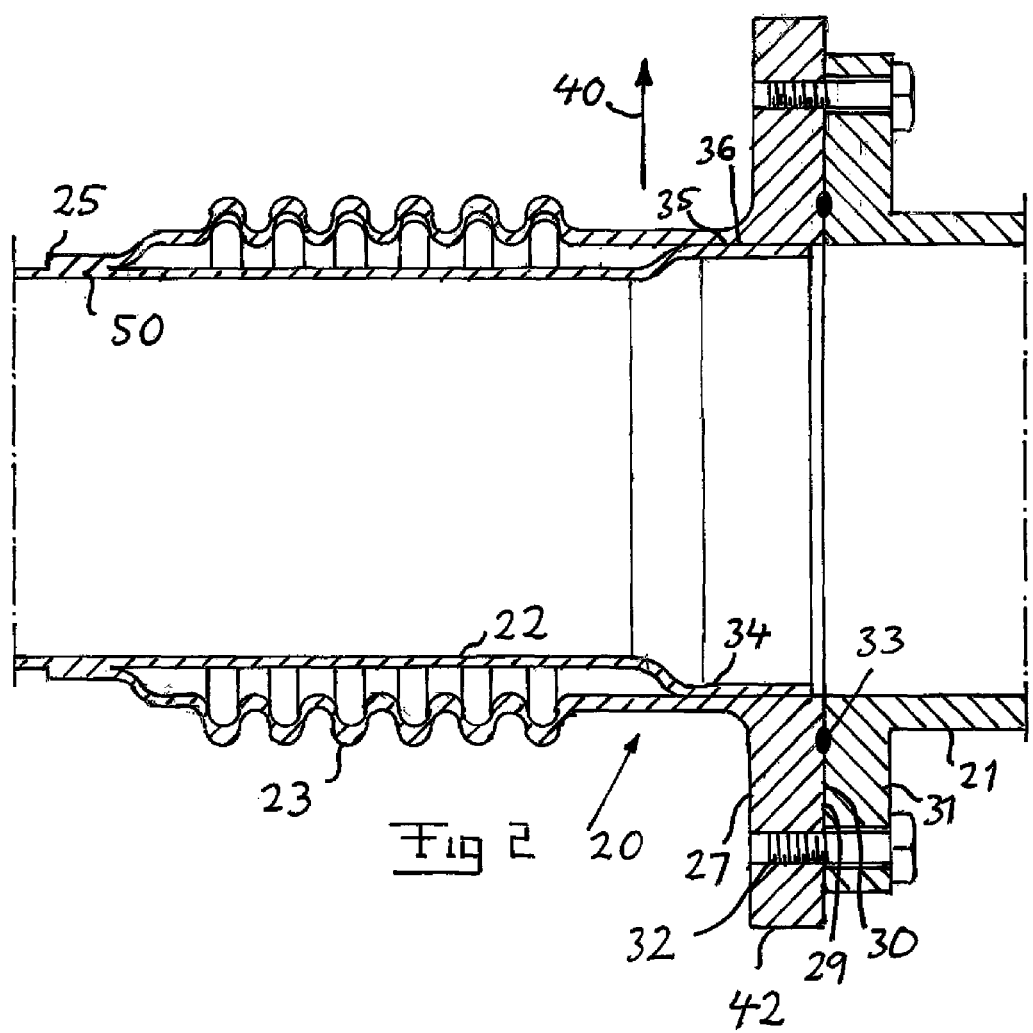
FIG. 2 shows a sectional view of the connection between a pipe unit according to one embodiment of the invention and a connecting pipe in the form of a branch pipe of the conduit according to FIG. 1.
Figure 3:
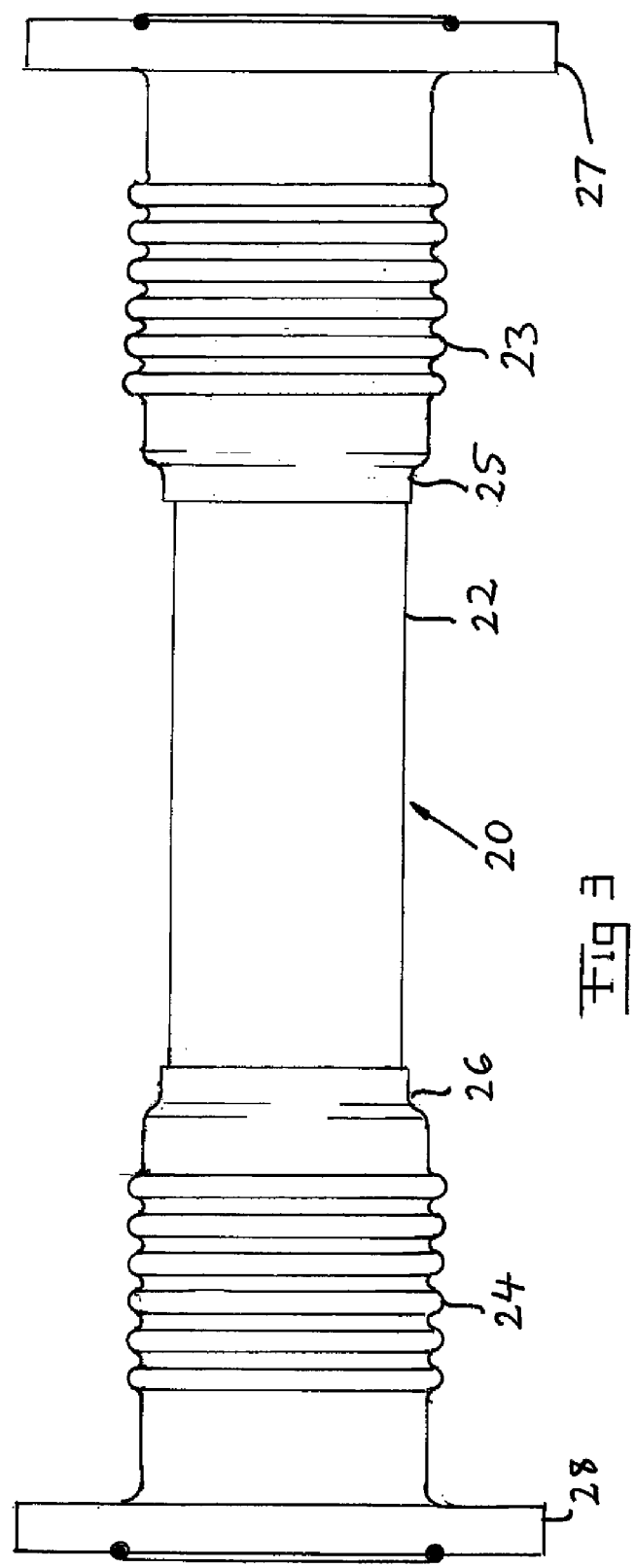
FIG. 3 illustrates the design of a pipe unit according to one embodiment of the invention, which is suitably arranged in a conduit of the type displayed in FIG. 1.

FIG. 3 illustrates the structure of a pipe unit 20 according to one embodiment of the invention, which pipe unit is applicable on the conduit displayed in FIG. 1 as an alternative to the pipe unit 5 displayed there. FIG. 2 shows a cross section of how the pipe unit 20 is structured at one of its ends, and where it is connected to a connecting section, corresponding to the connecting sections 4a and 6a displayed in FIG. 1, in a connecting pipe 21. The appearance of the pipe unit 20 is the same in both of these ends. The pipe unit has a pipe-shaped body 22 with, at each end, a pipe-shaped, flexible and bellows-shaped sealing element 23, 24, which at a first end 25, 26 is fixedly arranged via a welded joint 50 outside the pipe-shaped body 22, and which has a flange element 27, 28 at a second end 42. The flange element 27, 28 has flange surfaces 29, adapted to abut against flange surfaces 30 of a flange element 31 in a connecting pipe at a fixation of the connecting pipe 21 at the pipe unit 20. Such a fixation is intended to occur through a bolt joint 32.

An annular sealing element in the form of an O-ring 33 is adapted, at a said fixation of the sealing element's flange elements to a flange element in a connecting pipe, to be compressed between the flange elements, in order to establish a gas-proof connection between the pipe unit 20 and the connecting pipe 21. The pipe-shaped body 22 has end sections 34 with external circumferential surfaces 35, which, circumferentially abut against an internal wall surface 36 of the pipe unit's flange element 27, 28. Thus, an intended seal is achieved, which ensures that the seal is maintained even in the event any damage, such as a crack, should arise in the bellows-shaped sealing element 23, 24.

The flange element 27 of the bellows-shaped sealing element 23 is adapted to form one end of the pipe unit 20 by way of extending longer than the pipe-shaped body 22 in the direction from the first end 25 at the welded joint 50 towards the opposite end 42 of the sealing element, which means that the pipe-shaped body 22 will remain within the bellows-shaped sealing element and will not protrude into any connecting pipe 21 at the connection of the pipe unit 20 with such a connecting pipe.

Through the innovative design of the pipe unit 20, it becomes possible to dismantle this in relation to connecting pipes, such as the branch pipe 4 and the pipe 6 in FIG. 1, by loosening the bolt joints at the respective ends of the pipe unit, and then lifting it off transversely to its longitudinal extent, as indicated by the arrow 40 in FIG. 2. Thus, the pipe unit does not need to be bent to achieve this, since no part of the pipe unit in the fitted state protrudes into the connecting pipe or vice versa, and yet a secure double sealing function of the pipe unit is achieved.

The invention is obviously not limited in any way to the embodiment described above, but numerous possible modifications thereof should be obvious to a person skilled in the area, without departing from the framework of the invention as defined by the appended claims.

The invention claimed is:

1. A pipe unit adapted to be arranged in a conduit for a gaseous medium, wherein the pipe unit comprises:
   a pipe-shaped body;
   a pipe-shaped flexible sealing element, which at a first end is fixedly arranged outside the pipe-shaped body, and which at a second end comprises a flange element; and
   means adapted to detachably fixate said flange element of said sealing element to a flange element in a connecting pipe in the conduit, in order to, when the flange elements are fixed to each other and the pipe unit is accordingly connected with the connecting pipe, to allow movement between the pipe-shaped body and the connecting pipe via the sealing element's flexibility,
   wherein said means for fixation of the sealing element's flange element to a flange element in a connecting pipe are adapted to establish a gas-proof connection between the pipe unit and a said connecting pipe, and to form, via the mutual fixation of said flange element, the only touching connection of the pipe unit to a said connecting pipe, and
   wherein the pipe-shaped body has end sections with external circumferential surfaces, which circumferentially abut against an internal wall surface of the pipe element's flange elements.

2. A pipe unit according to claim 1, wherein the sealing element's flange element has flange surfaces, adapted to, in said fixation state, abut against flange surfaces of a said flange element in a said connecting pipe.

3. A pipe unit according to claim 2, wherein said flange surfaces of the sealing element are adapted to extend at a substantially right angle or at a right angle towards the pipe-shaped body's longitudinal extension.

4. A pipe unit according to claim 1, wherein said means comprise an annular sealing element, adapted, at said fixation of the sealing element's flange element to a flange element in a connecting pipe, to be compressed between the flange elements to establish said gas-proof connection between the pipe unit and the connecting pipe.

5. A pipe unit according to claim 4, wherein said sealing element is an O-ring.

6. A pipe unit according to claim 1, wherein said flange element of said sealing element is adapted to form one end of the pipe unit, by way of extending longer than said pipe-shaped body in a direction from said first end towards said second end of the sealing element.

7. A pipe unit according to claim 1, wherein said means comprise elements adapted to fix said flange elements to each other via a screw joint.

8. A pipe unit according to claim 1, wherein the pipe-shaped flexible sealing element is bellows-shaped.

9. A pipe unit according to claim 1, wherein said fixed arrangement of the pipe-shaped flexible sealing element outside of the pipe-shaped body comprises a welded joint.

10. A pipe unit according to claim 1, wherein the pipe unit is equipped with a said flexible sealing element at both ends of said pipe-shaped body.

11. A pipe unit according to claim 1, wherein the pipe unit is adapted to constitute a part of a conduit for recirculation of exhausts, which conduit is at least partly attached on a combustion engine.

12. A pipe unit according to claim 1, wherein the pipe unit is adapted to be fitted in a conduit, between a branch pipe receiving exhausts from an exhaust conduit in the combustion engine and a pipe which comprises an EGR-valve.

13. A motor vehicle comprising:
    a combustion engine; and
    a pipe unit comprising:
       a pipe-shaped body;
       a pipe-shaped flexible sealing element, which at a first end is fixedly arranged outside the pipe-shaped body, and which at a second end comprises a flange element; and
       means adapted to detachably fixate said flange element of said sealing element to a flange element in a connecting pipe in the conduit, in order to, when the flange elements are fixed to each other and the pipe unit is accordingly connected with the connecting pipe, to allow movement between the pipe-shaped body and the connecting pipe via the sealing element's flexibility,
       wherein said means for fixation of the sealing element's flange element to a flange element in a connecting pipe are adapted to establish a gas-proof connection between the pipe unit and a said connecting pipe, and to form, via the mutual fixation of said flange element, the only touching connection of the pipe unit to a said connecting pipe, and
       wherein the pipe-shaped body has end sections with external circumferential surfaces, which circumferentially abut against an internal wall surface of the pipe element's flange elements.

14. A vehicle according to claim 13, wherein the sealing element's flange element has flange surfaces, adapted to, in said fixation state, abut against flange surfaces of a said flange element in a said connecting pipe.

15. A vehicle according to claim 14, wherein said flange surfaces of the sealing element are adapted to extend at a substantially right angle or at a right angle towards the pipe-shaped body's longitudinal extension.

16. A vehicle according to claim 13, wherein said means comprise an annular sealing element, adapted, at said fixation of the sealing element's flange element to a flange element in a connecting pipe, to be compressed between the flange elements to establish said gas-proof connection between the pipe unit and the connecting pipe.

17. A vehicle according to claim 16, wherein said sealing element is an O-ring.

18. A vehicle according to claim 13, wherein said flange element of said sealing element is adapted to form one end of the pipe unit, by way of extending longer than said pipe-shaped body in a direction from said first end towards said second end of the sealing element.

19. A vehicle according to claim 13, wherein said means comprise elements adapted to fix said flange elements to each other via a screw joint.

20. A vehicle according to claim 13, wherein the pipe-shaped flexible sealing element is bellows-shaped.

* * * * *